US012629719B2

(12) United States Patent
Akutsu et al.

(10) Patent No.: US 12,629,719 B2
(45) Date of Patent: May 19, 2026

(54) DECORATIVE SHEET AND METHOD FOR PRODUCING DECORATIVE SHEET

(71) Applicant: TOPPAN HOLDINGS INC., Tokyo (JP)

(72) Inventors: Erika Akutsu, Tokyo (JP); Yohei Nishikawa, Tokyo (JP); Kosuke Shimizu, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/770,913

(22) Filed: Jul. 12, 2024

(65) Prior Publication Data

US 2024/0359210 A1     Oct. 31, 2024

Related U.S. Application Data

(63) Continuation of application No. PCT/JP2023/000659, filed on Jan. 12, 2023.

(30) Foreign Application Priority Data

Jan. 13, 2022     (JP) ................................. 2022-003877

(51) Int. Cl.
*B05D 5/02*          (2006.01)
*B05D 3/06*          (2006.01)
(Continued)

(52) U.S. Cl.
CPC .............. *B05D 5/02* (2013.01); *B05D 3/067* (2013.01); *B05D 2201/02* (2013.01);
(Continued)

(58) Field of Classification Search
CPC .......... B05D 3/065; B05D 3/068; B05D 5/02; B05D 2502/005; C09D 4/00; C09D 5/28;
(Continued)

(56) References Cited

U.S. PATENT DOCUMENTS

| | | | |
|---|---|---|---|
| 11,077,639 B2 | 8/2021 | Ma et al. | |
| 2007/0231583 A1* | 10/2007 | Ilzuka | B32B 27/10 |
| | | | 428/411.1 |

(Continued)

FOREIGN PATENT DOCUMENTS

| | | |
|---|---|---|
| JP | 2017-171794 A | 9/2017 |
| JP | 2019-119138 A | 7/2019 |

(Continued)

OTHER PUBLICATIONS

International Searching Authority, "International Search Report," issued in connection with International Patent Application No. PCT/JP2023/000659, dated Mar. 14, 2023.

(Continued)

*Primary Examiner* — Frank J Vineis
(74) *Attorney, Agent, or Firm* — Foley & Lardner LLP

(57)          ABSTRACT

A decorative sheet comprises a primary film layer and a surface protective layer, wherein the surface protective layer has a gloss of 15 or less; the surface protective layer has a ridge part protruding in a ridge shape on tis surface to form an irregular shape; the surface protective layer has a Martens hardness within the range of 20 N/mm$^2$ or more and 200 N/mm$^2$ or less; the surface protective layer contains an ionizing radiation curable resin as a main material; the ionizing radiation curable resin contains a trifunctional acrylic resin having a repeating structure as a main component; the number of repetitions of the repeating structure is 3 or more; and the irregular shape of the surface protective layer has RSm/Ra within the range of 10 or more and 300 or less.

6 Claims, 4 Drawing Sheets

(51) Int. Cl.
*C08J 7/043* (2020.01)
*C08J 7/12* (2006.01)

(52) U.S. Cl.
CPC ...... *B05D 2203/20* (2013.01); *B05D 2203/22* (2013.01); *B05D 2430/00* (2013.01); *C08J 7/043* (2020.01); *C08J 7/123* (2013.01)

(58) Field of Classification Search
CPC ......... B32B 3/30; B32B 27/16; B32B 27/308; B32B 2307/538; B32B 2307/408; B44C 5/0476
See application file for complete search history.

(56) References Cited

U.S. PATENT DOCUMENTS

| | | | | |
|---|---|---|---|---|
| 2008/0070005 A1* | 3/2008 | Kobayashi | ............ | B32B 27/08 |
| | | | | 428/161 |
| 2011/0143128 A1* | 6/2011 | Saitou | ............ | B29C 45/14811 |
| | | | | 428/335 |
| 2011/0171429 A1* | 7/2011 | Huang | ............ | B44C 1/172 |
| | | | | 428/161 |
| 2013/0129980 A1 | 5/2013 | Meinhard et al. | | |
| 2014/0255669 A1* | 9/2014 | Akou | ............ | B32B 27/365 |
| | | | | 428/203 |
| 2015/0099828 A1 | 4/2015 | Akimoto et al. | | |
| 2018/0043669 A1* | 2/2018 | Iriyama | ............ | B32B 27/20 |
| 2018/0043718 A1* | 2/2018 | Masubuchi | ............ | C08G 18/42 |
| 2018/0257328 A1* | 9/2018 | Shinbara | ............ | E04F 15/107 |
| 2019/0184688 A1* | 6/2019 | Shinbara | ............ | C08J 7/046 |
| 2020/0061885 A1* | 2/2020 | Fujii | ............ | B29C 45/14 |
| 2020/0290240 A1 | 9/2020 | Ma et al. | | |
| 2020/0299449 A1* | 9/2020 | Siband | ............ | C08G 18/6258 |
| 2023/0323144 A1* | 10/2023 | Kondo | ............ | B44F 1/02 |
| | | | | 428/141 |
| 2023/0364640 A1* | 11/2023 | Nishine | ............ | B44F 1/02 |

FOREIGN PATENT DOCUMENTS

| | | | | | |
|---|---|---|---|---|---|
| JP | 2020-111715 A | 7/2020 | | | |
| JP | 2021-137806 A | 9/2021 | | | |
| JP | 2021-165033 A | 10/2021 | | | |
| KR | 2020-0031282 A | 3/2020 | | | |
| KR | 2020-0059905 A | 5/2020 | | | |
| WO | WO-2021/201105 A1 | 10/2021 | | | |
| WO | WO-2022054645 A1 * | 3/2022 | ............ | B05D 5/02 |

OTHER PUBLICATIONS

International Searching Authority, "Written Opinion," issued in connection with International Patent Application No. PCT/JP2023/000659, dated Mar. 14, 2023.
European Extended Search Report issued in corresponding European Patent Application No. 23740312.6 dated Mar. 21, 2025.
Office Action issued in corresponding Chinese Patent Application No. 202380016101.5 dated Mar. 11, 2026.

* cited by examiner

DECORATIVE SHEET AND METHOD FOR PRODUCING DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2023/000659, filed on Jan. 12, 2023, which is based upon and claims the benefit to Japanese Patent Application No. 2022-003877 filed on Jan. 13, 2022, the disclosures of all which are incorporated herein by reference in their entirety.

TECHNICAL FIELD

The present invention relates to a decorative sheet that is used, for example, for surface decoration of the interior and exterior of buildings, fittings, furniture, fixtures, flooring, and the like, and to a method for producing the decorative sheet.

BACKGROUND

Decorative sheets are widely used in the aforementioned buildings to impart designability and durability to their surfaces by bonding them to the surface of wood, wood boards, metal plates, non-flammable boards, paper substrates, or resin substrates with adhesives to form decorative plates.

Designability can be selected according to the requirements and applications, ranging from patterns, such as wood grain and stone grain, formed by various printing methods to plain surfaces without patterns. Similarly, surface gloss is also an important item for designability, and is selected according to the requirements and applications, ranging from high gloss, such as a mirror-like surface, to low gloss with no reflection at all.

Moreover, as described above, another important function of decorative sheets along with designability is to impart durability. Durability is a comprehensive evaluation of scratch resistance, stain resistance, and the ability to maintain them over a long period of time. Although the requirements vary depending on the environment and conditions in which decorative sheets are used, decorative sheets with high performance are always required.

In order to impart durability, it is common to form a surface protective layer on the outermost surface of the decorative sheet. In order to adjust the gloss mentioned above, particularly in order to achieve low gloss, it is common to add a matting agent (matting additive) to the surface protective layer.

Further, since decorative sheets are generally subjected to processing, such as cutting and bending, to form decorative plates or decorative materials, it is preferable that they have processability that can withstand such processing.

As a decorative sheet in which designability (low gloss), scratch resistance, and stain resistance are thus taken into consideration, for example, there is the decorative sheet disclosed in PTL 1.

[Citation List] [Patent Literature] PTL 1: JP 2019-119138 A.

SUMMARY OF THE INVENTION

Technical Problem

In recent years, due to the expansion of the applications of decorative plates using decorative sheets and the increasing awareness of quality among consumers, it is required to have a gloss of 15 or less and satisfy all of fingerprint resistance, scratch resistance, stain resistance, and processability.

In order to satisfy these requirements, regarding gloss adjustment, there is a method to roughen the surface by adding a matting agent; however, adding a large amount thereof can cause the following problems. (1) Fingerprint stains become difficult to remove, and fingerprint resistance decreases. (2) The matting agent is detached in the scratch resistance test, and scratch resistance decreases. (3) Stains become difficult to remove, and stain resistance decreases. (4) Blushing occurs due to the matting agent during bending, and bending processability decreases. In particular, regarding processability, when the crosslinking density of the resin used for the surface protective layer is increased with the intention of improving scratch resistance, (5) the sheet tends to curl significantly due to curing shrinkage, making it difficult to laminate the sheet onto the substrate. In addition, (6) the decorative sheet tends to tear because the surface protective layer is too hard.

In order to solve the above problems, an object of the present invention is to provide a decorative sheet that has excellent designability with low gloss and also has fingerprint resistance, high durability (particularly scratch resistance and stain resistance), and processability (easy to laminate onto the substrate and hard to tear), and to provide a method for producing the same.

Solution to Problem

The present inventors optimized the irregular shape of the surface protective layer, and further repeated experiments to find the necessary structural elements for the material used in the surface protective layer. As a result, the present inventors found that it is possible to provide a decorative sheet that has a gloss of 15 or less and also has fingerprint resistance, high durability (particularly scratch resistance and stain resistance), and processability (easy to laminate onto the substrate and hard to tear).

In order to achieve the object, the gist of the decorative sheet according to one embodiment of the present invention is that it comprises a primary film layer and a surface protective layer provided on one surface of the primary film layer, wherein the surface protective layer has a gloss of 15 or less; the surface protective layer has a ridge part protruding in a ridge shape on tis surface to form an irregular shape; the surface protective layer contains an ionizing radiation curable resin as a main material; the ionizing radiation curable resin contains a trifunctional acrylic resin having a repeating structure as a main component; the number of repetitions of the repeating structure is 3 or more; the irregular shape of the surface protective layer has RSm/Ra within the range of 10 or more and 300 or less; and the surface protective layer has a Martens hardness within the range of 20 N/mm$^2$ or more and 200 N/mm$^2$ or less.

Advantageous Effects of the Invention

According to one embodiment of the present invention, it is possible to provide a decorative sheet that has a gloss of 15 or less and satisfies all of fingerprint resistance, scratch resistance, stain resistance, and processability.

DETAILED DESCRIPTION

The configuration of a decorative sheet according to an embodiment of the present invention will be described below with reference to the drawings.

The drawings are schematic, and the relationship between the thickness and the horizontal dimension, the thickness ratio between each layer, and the like differ from actual values. Moreover, the embodiments shown below are examples of the configuration for embodying the technical idea of the present invention, and the technical idea of the present invention may undergo various modifications within the technical scope defined by the claims as stated in the claims.

(Configuration)

Figure 1:
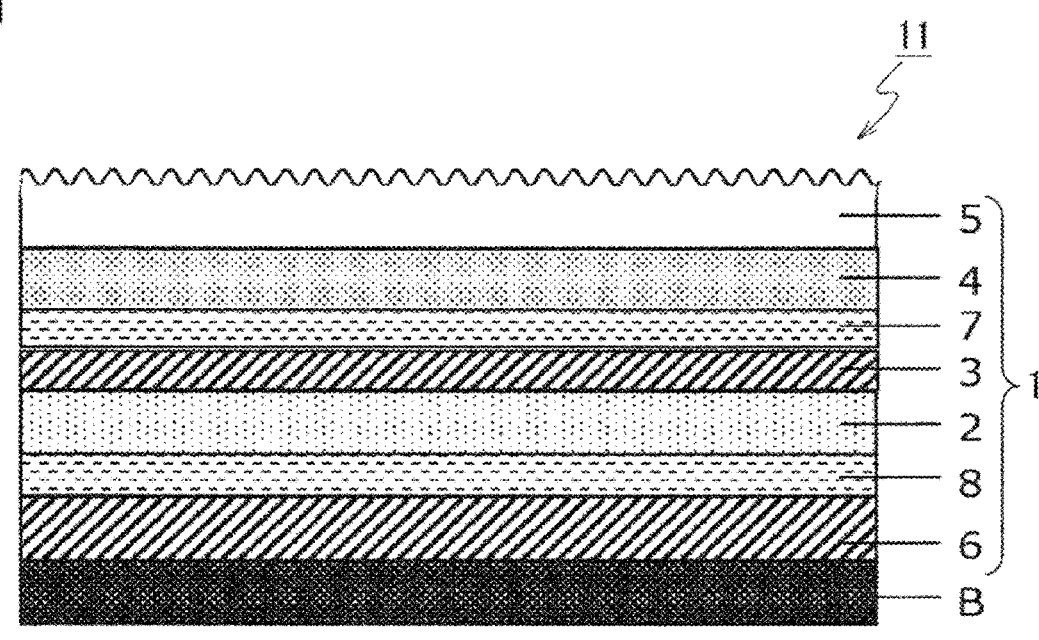
FIG. 1 is a schematic cross-sectional view explaining the configuration of a decorative sheet according to an embodiment of the present invention.

The decorative sheet 1 of the present embodiment is configured such that, as shown in FIG. 1, a pattern layer 3, an adhesive layer 7 (a heat-sensitive adhesive layer, an anchor coat layer, or a dry lamination adhesive layer), a transparent resin layer 4, and a surface protective layer 5 are laminated in this order on the front side, which is one surface, of a primary film layer (substrate layer) 2. Further, a concealing layer 8 and a primer layer 6 are provided on the back side, which is the other surface, of the primary film layer 2. The pattern layer 3, adhesive layer 7, transparent resin layer 4, concealing layer 8, and primer layer 6 may be omitted.

The decorative sheet 1 of the present embodiment is bonded to a substrate B to form a decorative material 11, as shown in FIG. 1. The substrate B is not particularly limited, but may be made of, for example, a wood board, an inorganic board, a metal plate, a composite board made of multiple materials, or the like.

<Primary Film Layer 2>

As the primary film layer 2, it is possible to use any material selected from, for example, paper, synthetic resin, foamed synthetic resin, rubber, nonwoven fabric, synthetic paper, and metal foil. Examples of paper include tissue paper, titanium paper, resin-impregnated paper, and the like. Examples of synthetic resins include polyethylene, polypropylene, polybutylene, polystyrene, polycarbonate, polyester, polyamide, an ethylene-vinyl acetate copolymer, polyvinyl alcohol, acrylic, and the like. Examples of rubber include ethylene-propylene copolymer rubber, ethylene-propylene-diene copolymer rubber, styrene-butadiene copolymer rubber, styrene-isoprene-styrene block copolymer rubber, styrene-butadiene-styrene block copolymer rubber, polyurethane, and the like. As the non-woven fabric, an organic or inorganic non-woven fabric can be used.

Examples of the metal of the metal foil include aluminum, iron, gold, silver, and the like.

When an olefin-based resin is used as the primary film layer 2, the surface of the primary film layer 2 is often inactive, and it is thus preferable to provide a primer layer 6 between the primary film layer 2 and the substrate B. In addition to that, in order to improve adhesiveness between the primary film layer 2 made of an olefin-based material and the substrate B, the primary film layer 2 may be subjected to surface modification treatment, such as a corona treatment, plasma treatment, ozone treatment, electron beam treatment, ultraviolet ray treatment, or dichromate treatment.

The primer layer 6 may be made of the same material as that of the pattern layer 3, which will be described later. Since the primer layer 6 is applied to the back side of the decorative sheet 1, considering that the decorative sheet 1 will be wound up into a web, in order to avoid blocking and improve the adhesion to the adhesive, an inorganic filler may be added to the primer layer 6. Examples of the inorganic filler include silica, alumina, magnesia, titanium oxide, barium sulfate, and the like.

The thickness of the primary film layer 2 is preferably within the range of 20 μm or more and 250 μm or less, in terms of printing workability, cost, etc.

<Pattern Layer 3>

The pattern layer 3 is a pattern layer printed on the primary film layer 2 using an ink. A binder for the ink may be appropriately selected from, for example, nitrocellulose, cellulose, vinyl chloride-vinyl acetate copolymer, polyvinyl butyral, polyurethane, acrylic, polyester, and modified products thereof. The binder may be any of aqueous, solvent, and emulsion types, and may be a one-part type or a two-part type which uses a curing agent. Further, a curable ink may be used, and the ink may be cured by irradiation with ultraviolet rays, electron beams, or the like. Among these, the most typical method is the use of a urethane-based ink cured by isocyanate. In addition to these binders, for example, coloring agents such as pigments and dyes, extender pigments, solvents, and various additives contained in general ink may be added to the pattern layer 3. Examples of highly versatile pigments include condensed azo pigments, insoluble azo pigments, quinacridone, isoindoline, anthraquinone, imidazolone, cobalt, phthalocyanine, carbon, titanium oxide, iron oxide, pearl pigments of mica, and the like.

Moreover, besides the application of ink, vapor deposition or sputtering of various metals can be performed to apply a design to the pattern layer 3. In particular, it is preferable to add a photostabilizer to the above ink, which can suppress the degradation of the decorative sheet 1 itself caused by the photodegradation of the ink and can extend the life of the decorative sheet 1.

<Adhesive Layer 7>

The adhesive layer 7 is a layer also called a heat-sensitive adhesive layer, an anchor coat layer, or a dry lamination adhesive layer.

The resin material for the adhesive layer 7 is not particularly limited, and can be appropriately selected from, for example, acrylic, polyester, polyurethane, and epoxy-based resin materials, and the like. Further, for example, an ethylene-vinyl acetate copolymer resin-based adhesive can also be used as the resin material for the adhesive layer 7. An application method can be appropriately selected depending on the viscosity of the adhesive and the like and may be typically gravure coating. After being applied on the top of the pattern layer 3 by gravure coating, the adhesive layer 7 is laminated on the transparent resin layer 4. The adhesive layer 7 may be omitted when the adhesiveness between the transparent resin layer 4 and the pattern layer 3 is sufficient.

<Transparent Resin Layer 4>

As the resin material for the transparent resin layer 4, an olefin-based resin is preferably used. Examples of the olefin-based resin include, besides polypropylene, polyethylene, polybutene, and the like, a homopolymer or a copolymer of one or more of α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, etc.), and a copolymer of ethylene or an α-olefin with another monomer, for example, an ethylene-vinyl acetate copolymer, ethylene-vinyl alcohol copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, and the like.

Further, in order to improve the surface hardness of the decorative sheet 1, highly crystalline polypropylene is preferably used as the resin of the transparent resin layer 4. Various additives such as a thermal stabilizer, photostabilizer, anti-blocking agent, catalyst scavenger, coloring agent, light scattering agent, and matting agent can also be added to the transparent resin layer 4. It is common to add a phenol-based, sulfur-based, phosphorus-based, or hydrazine-based heat stabilizer as the heat stabilizer, and a hindered amine-based photostabilizer as the photostabilizer, each in any combination.

<Surface Protective Layer 5>

The surface protective layer 5 has a core part 5A and a ridge part 5B protruding in a ridge shape from one surface of the core part 5A. Due to this, an irregular shape is formed on the surface of the surface protective layer 5.

In the decorative sheet 1 according to the present embodiment, the term "ridge" refers to an elongated raised shape that is linearly connected in plan view. The ridge part 5B may be curved or straight in plan view, but is preferably curved, from the viewpoint of the fingerprint resistance of the decorative sheet 1. In the present disclosure, the ridge part 5B refers to, for example, a part from the lowest point to the tip of the irregular shape provided on the surface of the surface protective layer 5, and the core part 5A refers to a part excluding the ridge part 5B of the surface protective layer 5.

Figure 2:
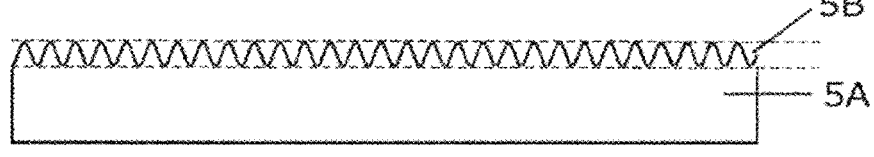
FIG. 2 is a schematic cross-sectional view explaining a configuration of a surface protective layer of a decorative sheet according to an embodiment of the present invention.
Figure 3:
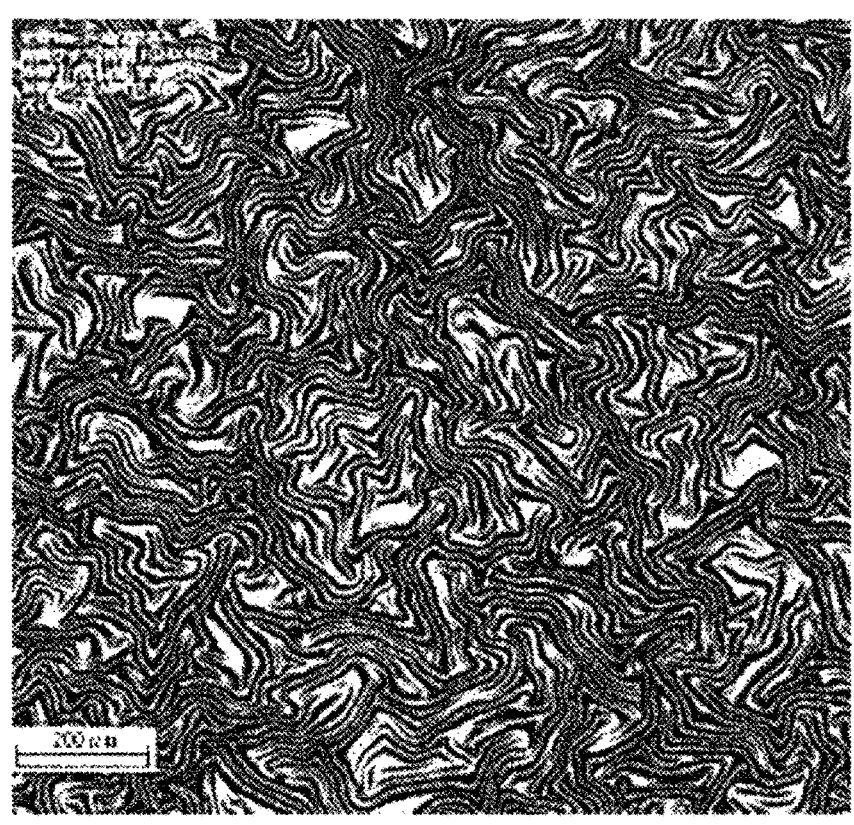
FIG. 3 is a plan photograph illustrating a configuration example of the surface of a surface protective layer of a decorative sheet according to an embodiment of the present invention.

FIG. 2 is a cross-sectional view schematically showing the cross section of the ridge part 5B (the cross section in the thickness direction of the surface protective layer 5) of the surface protective layer 5, and FIG. 3 is a plan photograph showing the configuration of the surface of the surface protective layer 5. FIG. 3 is a plan photograph taken by a laser microscope (OLS-4000, manufactured by Olympus Corporation).

The ridge part 5B has an elongated raised shape that is linearly connected in plan view, as shown in the plan view of FIG. 3. The ridge part 5B is formed by irradiating the surface of an ionizing radiation curable resin with light of a specific wavelength to shrink the surface of the ionizing radiation curable resin, as described later.

The shape of the ridge part 5B can be expressed as RSm/Ra of the surface roughness index RSm (μm) in the horizontal direction (the planar direction of the surface protective layer 5, and the lateral direction in FIG. 2) and the surface roughness index Ra (μm) in the vertical direction (the depth direction of the ridge part 5B, the thickness direction of the surface protective layer 5, and the longitudinal direction in FIG. 2), and RSm/Ra is 10 or more and 300 or less. More preferably, RSm/Ra is 50 or more and 300 or less. If RSm/Ra is less than 10, the shape of the ridge part 5B is too fine, which makes it difficult to wipe off stains, resulting in poor stain resistance. If RSm/Ra is more than 300, the spacing of the ridges is too wide to obtain low gloss.

RSm/Ra is more preferably 100 or more and 300 or less. When RSm/Ra is within this numerical range, the spacing of the ridges is appropriately wide, which improves the affinity for water or cleaning agents (water containing a surfactant or alcohol). Therefore, if the decorative sheet has RSm/Ra within this numerical range, even if the surface of the decorative sheet is stained, it will be easy to wipe off stains using water or a cleaning agent.

RSm/Ra is most preferably 100 or more and 250 or less. When RSm/Ra is within this numerical range, commonly available cleaning sponges can easily penetrate between the ridges. Even if the surface of the decorative sheet is stained, it will be easy to wipe off the stains using a commonly available cleaning sponge.

Ra and RSm are values measured using a line roughness meter (according to JIS B 0601).

The cross-sectional shape of the ridge part 5B in the thickness direction of the surface protective layer 5 may be a sine wave shape.

Figure 4:
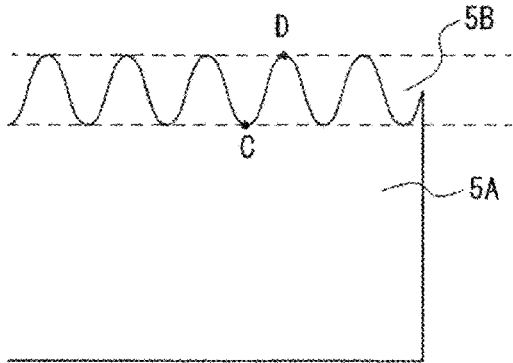
FIG. 4 is a schematic cross-sectional view explaining the cross-sectional shape of a ridge part according to an embodiment of the present invention.

The "sine wave shape" refers to a shape that can be represented by a sinusoidal line from the lowest position C to the highest position (vertex) D of the ridge part 5B, as shown in FIG. 4.

The mechanism by which the ridge part 5B is formed will be described below.

When acrylate is irradiated with light of a wavelength of 200 nm or less as the first irradiation light, the acrylate can be self-excited. Therefore, it is possible to crosslink acrylate by irradiating the acrylate with light at 200 nm or less. In the acrylate, light at 200 nm or less reaches depths of several tens to hundreds of nanometers. Therefore, only the surface is crosslinked, and the area under the crosslinked surface is fluid, resulting in a wavy fine irregular shape that resembles folded wrinkles.

In the thus-formed surface protective layer 5, there is no interface between the core part 5A and the ridge part 5B, and the core part 5A and the ridge part 5B are formed in an integrally continuous shape.

Light at 200 nm or less is absorbed by oxygen in the air to be significantly attenuated. Therefore, when the acrylate is treated, it is necessary to introduce nitrogen gas to control the reaction atmosphere. The residual oxygen concentration in the reaction atmosphere is preferably suppressed to 2000 ppm or less. More preferably, the residual oxygen concentration in the reaction atmosphere is 1000 ppm or less.

In order to form an irregular shape by light at a wavelength of 200 nm or less, which is first irradiation light, the integrated light intensity of the first irradiation light is preferably set to 0.5 mJ/cm$^2$ or more and 200 mJ/cm$^2$ or less. More preferably, the integrated light intensity is 1 mJ/cm$^2$ or more and 100 mJ/cm$^2$ or less. Even more preferably, the integrated light intensity is 3 mJ/cm$^2$ or more and 50 mJ/cm$^2$ or less. Most preferably, the integrated light intensity is 5 mJ/cm$^2$ or more and 30 mJ/cm$^2$ or less. If the integrated light intensity is less than 0.5 mJ/cm$^2$, the curing shrinkage reaction is weak, and an irregular shape is not sufficiently formed; thus, gloss is not reduced. If the integrated light intensity is more than 200 mJ/cm$^2$, the curing shrinkage reaction becomes too strong, causing the surface condition to deteriorate.

Light at 200 nm or less can be extracted with excimer VUV light. The excimer VUV light can be produced from a noble gas or noble gas halide compound lamp. When high-energy electrons are externally applied to a lamp containing a noble gas or noble gas halide compound gas, a large quantity of discharge plasma (dielectric barrier discharge) is generated. This plasma discharge excites the atoms of the discharge gas (noble gas) and instantaneously turns them into an excimer state. When the excimer state returns to the ground state, light in the excimer-specific wavelength region is emitted.

The gas used in the excimer lamp may be any conventionally used gas as long as it emits light at 200 nm or less. The gas used can be a noble gas, such as Xe, Ar, or Kr, or a mixed gas of noble gas and halogen, such as ArBr or ArF. Excimer lamps vary in wavelength (central wavelength) depending on gas, and have a wavelength of, for example, about 172 nm (Xe), about 126 nm (Ar), about 146 nm (Kr), about 165 nm (ArBr), or about 193 nm (ArF).

However, considering the magnitude of the photon energy obtained, and the difference between the wavelength and the binding energy of the organic material, it is preferable to use, as the light source, a xenon lamp that emits excimer light with a central wavelength of 172 nm. Further, considering the cost of equipment maintenance, the availability of materials, etc. as well, it is preferable to use a xenon lamp as the light source.

Since light at a wavelength of 200 nm or less, which is first irradiation light, only reaches depths of tens to hundreds of nm from the top surface in the acrylate, the inside of the surface protective layer 5, which has the ridge part 5B formed by irradiation with light of 200 nm or less, is fluid, and the curing reaction must proceed further. In order to cure the surface protective layer 5 after irradiation with light at 200 nm or less, ionizing radiation or UV light of a longer wavelength than that of the light having a wavelength of 200 nm or less, which is the first irradiation light, can be used as the second irradiation light.

In the present embodiment, for example, after irradiation with the second irradiation light, a different type of ionizing radiation than the second irradiation light or UV light of a longer wavelength than that of the second irradiation light may be applied as third irradiation light; however, it is preferable to form the surface protective layer 5 having the ridge part 5B by irradiation using only two types of light, i.e., the first irradiation light and the second irradiation light. The third irradiation light may be applied if the strength of the surface protective layer 5 is not sufficient only by irradiation with the second irradiation light.

In order to cure the entire surface protective layer 5 by irradiation with the second irradiation light, the integrated light intensity of the second irradiation light is preferably set to 10 mJ/cm$^2$ or more and 500 mJ/cm$^2$ or less. More preferably, the integrated light intensity is 50 J/cm$^2$ or more and 400 mJ/cm$^2$ or less. Even more preferably, the integrated light intensity is 100 mJ/cm$^2$ or more and 300 mJ/cm$^2$ or less. If the integrated light intensity is less than 10 mJ/cm$^2$, the curing reaction is weak, and sufficient strength cannot be imparted to the entire surface protective layer 5; thus, scratch resistance tends to decrease. If the integrated light intensity is more than 500 mJ/cm$^2$, the curing reaction tends to become too strong, causing the surface condition to deteriorate.

It is also preferable that the integrated light intensity of the second irradiation light is higher than the integrated light intensity of the first irradiation light. The integrated light intensity of the second irradiation light is preferably 1.1 times or more and 50.0 times or less, and more preferably 5.0 times or more and 30.0 or less, the integrated light intensity of the first irradiation light. If the integrated light intensity of the second irradiation light is less than 1.1 times the integrated light intensity of the first irradiation light, the curing reaction is weak, and sufficient strength may not be imparted to the entire surface protective layer 5. If the integrated light intensity of the second irradiation light is more than 50.0 times the integrated light intensity of the first irradiation light, the curing reaction of the entire surface protective layer 5 becomes too strong, which may deform the shape of the ridge part 5B.

Changes over time in the irradiation light intensity of the first irradiation light, and changes over time in the irradiation light intensity of the second irradiation light are explained below with reference to FIGS. 5(a)-5(j).

FIGS. 5(a)-5(j) schematically show changes over time in the irradiation light intensity of the first irradiation light and changes over time in the irradiation light intensity of the second irradiation light.

FIGS. 5(a), 5(c), 5(e), 5(g), and 5(i) schematically show changes over time in the irradiation light intensity of the first irradiation light. Further, FIGS. 5(b), 5(d), 5(f), 5(h), and 5(j) schematically show changes over time in the irradiation light intensity of the second irradiation light.

Figure 5:
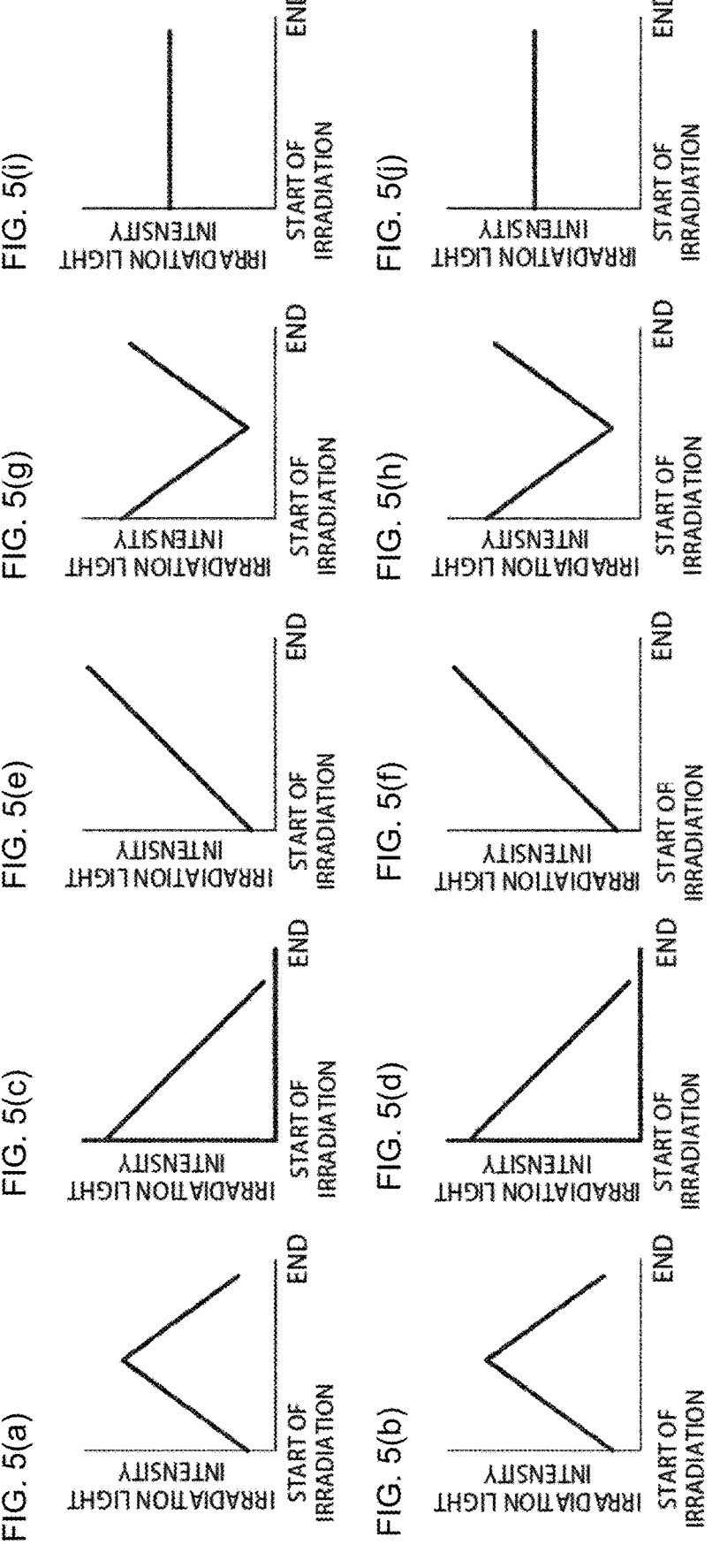
FIGS. 5(*a*)-5(*j*) are schematic views explaining changes over time in the irradiation light intensity of each irradiation light in the production process of a decorative sheet according to an embodiment of the present invention.

The irradiation light intensity of the first irradiation light may gradually increase as the irradiation time progresses, and then gradually decrease as the irradiation time progresses, as shown in FIG. 5(a). Further, the irradiation light intensity of the first irradiation light may gradually decrease as the irradiation time progresses, as shown in FIG. 5(c). Further, the irradiation light intensity of the first irradiation light may gradually increase as the irradiation time progresses, as shown in FIG. 5(c). Further, the irradiation light intensity of the first irradiation light may gradually decrease as the irradiation time progresses, and then gradually increase as the irradiation time progresses, as shown in FIG. 5(g). Further, the irradiation light intensity of the first irradiation light may be constant from the start of irradiation to the end of irradiation, as shown in FIG. 5(i).

The irradiation light intensity of the second irradiation light may gradually increase as the irradiation time progresses, and then gradually decrease as the irradiation time progresses, as shown in FIG. 5(b). Further, the irradiation light intensity of the second irradiation light may gradually decrease as the irradiation time progresses, as shown in FIG. 5(d). Further, the irradiation light intensity of the second irradiation light may gradually increase as the irradiation time progresses, as shown in FIG. 5(f). Further, the irradiation light intensity of the second irradiation light may gradually decrease as the irradiation time progresses, and then gradually increase as the irradiation time progresses, as shown in FIG. 5(h). Further, the irradiation light intensity of the second irradiation light may be constant from the start of irradiation to the end of irradiation, as shown in FIG. 5(j).

In addition, in the present embodiment, the irradiation forms of the first irradiation light shown in FIGS. 5(a), 5(c), 5(c), 5(g), and 5(i), and the irradiation forms of the second irradiation light shown in FIGS. 5(b), 5(d), 5(f), 5(h), and 5(j) can be used in combination, as appropriate. For example, the irradiation form of the first irradiation light shown in FIG. 5(a) and the irradiation form of the second irradiation light shown in FIG. 5(f) may be used in combination. Further, the irradiation form of the first irradiation light shown in FIG. 5(g) and the irradiation form of the second irradiation light shown in FIG. 5(f) may be used in combination. When RSm/Ra value is set to 10 or more and 300 or less, the irradiation form of the first irradiation light shown in FIG. 5(c) and the irradiation form of the second irradiation light shown in FIG. 5(f) may be used in combination.

As described above, the ridge part 5B formed by irradiation with light of 200 nm or less has a finer structure than the irregular shape formed on the surface of the surface protective layer 5 by mechanical processing, such as embossing. Because such a fine irregular shape is formed on the surface of the surface protective layer 5, it is possible to improve fingerprint resistance while maintaining the matte texture of the surface of the decorative sheet 1.

The surface protective layer 5 is a resin layer having a Martens hardness of 20 N/mm$^2$ or more and 200 N/mm$^2$ or less. More preferably, the Martens hardness is 50 N/mm$^2$ or more and 150 N/mm$^2$ or less. If the Martens hardness of the surface protective layer 5 is less than 20 N/mm$^2$, scratch resistance decreases, which is not preferable. If the Martens hardness of the surface protective layer 5 is more than 200 N/mm$^2$, the sheet is curled significantly due to curing shrinkage, making it difficult to laminate it onto the substrate during processing, and the hardness of the coat causes the decorative sheet to tear during bonding and transport during processing, resulting in lower yields, which is not preferable. Further, the hardness of the coat also deteriorates scratch resistance using the Hoffman scratch test, which is not preferable. The Martens hardness mentioned above may be the Martens hardness of the ionizing radiation curable resin that forms the surface protective layer 5. That is, as the ionizing radiation curable resin that forms the surface protective layer 5, it is preferable to use a resin having a Martens hardness of 20 N/mm$^2$ or more and 200 N/mm$^2$ or less, more preferably 50 N/mm$^2$ or more and 150 N/mm$^2$ or less, and even more preferably 80 N/mm$^2$ or more and 150 N/mm$^2$ or less. Specifically, the Martens hardness of the trifunctional acrylic resin, which forms the surface protective layer 5 and has, as a repeating structure, any of ethylene oxide, propylene oxide, and ε-caprolactone structures, is preferably 20 N/mm$^2$ or more and 200 N/mm$^2$ or less, more preferably 50 N/mm$^2$ or more and 150 N/mm$^2$ or less, and even more preferably 80 N/mm$^2$ or more and 150 N/mm$^2$ or less. The Martens hardness value can be adjusted arbitrarily by selecting the type and molecular weight of the ionizing radiation curable resin that forms the surface protective layer 5. Further, when the surface protective layer 5 is composed of a plurality of resins, the Martens hardness value can be adjusted arbitrarily by adjusting the content ratio of the constituent resins.

When the surface protective layer 5 is formed of a plurality of layers, the Martens hardness of the top layer of the surface protective layer 5 may be adjusted within the above numerical range, or the Martens hardness of the bottom layer of the surface protective layer 5 may be adjusted within the above numerical range. Alternatively, the Martens hardness value may be gradually reduced from the top layer to the bottom layer of the surface protective layer 5.

The Martens hardness defined in the present embodiment is a value measured according to ISO 14577. Further, the Martens hardness defined in the present embodiment is the average value of measurements taken at 10 randomly selected points in the same sample.

The layer thickness of the surface protective layer 5 is preferably within the range of 2 μm or more and 20 μm or less. More preferably, the layer thickness of the surface protective layer 5 is within the range of 3 μm or more and 20 μm or less. Even more preferably, the layer thickness of the surface protective layer 5 is within the range of 5 μm or more and 15 μm or less. Most preferably, the layer thickness of the surface protective layer 5 is within the range of 5 μm or more and 12 μm or less. If the layer thickness of the surface protective layer 5 is less than 2 μm, vacuum ultraviolet light does not penetrate deeply, and low gloss cannot be achieved. If the layer thickness of the surface protective layer 5 is thicker than 20 μm, processability is reduced and blushing occurs during bending.

The layer thickness of the surface protective layer 5 is preferably set so that the ratio of the layer thickness of the ridge part 5B to the layer thickness of the core part 5A (layer thickness of ridge part 5B/layer thickness of core part 5A) is 0.01 or more and 2.0 or less, and more preferably 0.1 or more and 1.0 or less.

The pattern layer 3 and the surface protective layer 5 can be formed, for example, by various printing methods, such as a gravure printing method, offset printing method, screen printing method, electrostatic printing method, and ink-jet printing method. Furthermore, because the surface protective layer 5 covers the entire surface on the front side of the primary film layer 2, it can also be formed by various coating methods, such as roll coating, knife coating, micro gravure coating, and die coating. A method may be individually selected from these printing and coating methods for each layer, or the same method may be selected for all the layers to carry out collective processing.

The pattern layer 3 and the surface protective layer 5 may be synchronized with each other, from the viewpoint of designability. In the case of synchronizing these layers, after the pattern layer 3 is formed, it is necessary to collectively form the surface protective layer 5, and it is thus preferable to use a gravure printing method. Further, a gravure printing method is preferable because of its relatively high speed and cost advantage. Synchronization means that 50% or more, preferably 70% or more, and most preferably 90% or more, of the area where the surface protective layer 5 is formed overlaps with the picture area of the pattern layer 3 in plan view.

In order to adjust the thickness of the surface protective layer 5, the coating amount may be controlled when performing the above printing method or coating method. In each printing method or coating method, the coating amount can be calculated by producing a product in which a surface protective layer is formed on the substrate (primary film layer), and a product in which a surface protective layer is not formed, and then calculating a mass difference.

The main material of the surface protective layer 5 is an ionizing radiation curable resin. The main material refers to a material that is contained in an amount of 60 parts by mass or more, more preferably 70 parts by mass or more, and most preferably 80 parts by mass or more, based on 100 parts by mass of the surface protective layer. As the ionizing radiation curable resin that forms the surface protective layer 5, known resins, such as various monomers and commercially available oligomers, can be used. For example, (meth) acrylic resins, silicon-based resins, polyester-based resins, urethane-based resins, amide-based resins, and epoxy-based resins can be used. The ionizing radiation curable resin may be an aqueous resin or a non-aqueous (organic solvent-based) resin.

The main component of the ionizing radiation curable resin that forms the surface protective layer 5 is a trifunctional acrylate resin having a repeating structure. Usable examples of the trifunctional acrylate resin include trimethylolpropane triacrylate, glycerol triacrylate, isocyanurate triacrylate, pentaerythritol triacrylate, and the like.

The main component refers to a component that is contained in an amount of 60 parts by mass or more, more preferably 70 parts by mass or more, and most preferably 80 parts by mass or more, based on 100 parts by mass of the constituent resin components. In the case of a bifunctional acrylate resin, the degree of crosslinking is insufficient and scratch resistance decreases, which is not preferable. In the case of a tetrafunctional or higher functional acrylate resin, the degree of crosslinking becomes too high, and processability thus decreases, which is not preferable.

When a gravure printing method is used as the coating method, the viscosity of the ionizing radiation curable resin is preferably within the range of 10 to 500 mPa·s, and optimally 50 to 300 mPa·s. Therefore, it is preferable to use trimethylolpropane triacrylate or glycerol triacrylate as the trifunctional acrylate resin because the viscosity can be within the preferable or optimal range. Resins with a skeleton that induces hydrogen bonding or x-x stacking are often not preferable because their viscosity is as high as 500 mPa·s or more. Further, in order to adjust the viscosity, an organic solvent or a low-viscosity bifunctional acrylate resin can be added. However, it is preferable not to use an organic solvent, from the viewpoint of environmental impact. Bifunctional acrylate resins are not preferred because scratch resistance decreases if they are added in large amounts. Therefore, when a bifunctional acrylate resin is added to a trifunctional acrylate resin, the content of the bifunctional acrylate resin is preferably within the range of 10 mass % or more and 30 mass % or less, and more preferably within the range of 15 mass % or more and 20 mass % or less, relative to the content (mass) of the trifunctional acrylate resin.

Trimethylolpropane triacrylate is easy to obtain and is more preferable than glycerol triacrylate from the viewpoint of versatility.

The repeating structure is preferably any of an ethylene oxide (EO) structure, a propylene oxide (PO) structure, and a ε-caprolactone (CL) structure. More preferably, the repeating structure is ethylene oxide or propylene oxide. The ethylene oxide structure, propylene oxide structure, and ε-caprolactone structure are preferable because the molecules are freely rotatable and highly flexible, so that the molecules are easily folded by light at 200 nm or less, and a fine irregular shape can be easily formed. The number of repetitions of the repeating structure is 3 or more. More preferably, the number of repetitions is 3 or more and 30 or less, and most preferably 3 or more and 20 or less. If the number of repetitions is 2 or less, when vacuum ultraviolet light (VUV light) is applied, the ionizing radiation curable resin that forms the surface protective layer 5 does not shrink sufficiently, and the surface protective layer 5 does not become low gloss. If the number of repetitions is larger than 30, the crosslinking density is reduced, and the scratch resistance of the surface protective layer 5 is deteriorated.

The number of repetitions of the repeating structure can be analyzed by using MALDI-TOF-MS. The ionizing radiation curable resin may have a molecular weight distribution. If the ionizing radiation curable resin has a molecular weight distribution, the number of repetitions corresponds to the molecular weight that has the most intense peak in the MALDI-TOF-MS mass spectrum.

The surface protective layer 5 may contain particles. By adding particles with an optimal particle size and an optimal content, a uniform surface can be formed. Usable examples of the particles include organic materials, such as PE wax, PP wax, and resin beads, or inorganic materials, such as silica, glass, alumina, titania, zirconia, calcium carbonate, and barium sulfate. The average particle size (D50) of the particles is preferably 10 μm or less. The average particle size (D50) is more preferably 1 μm or more and 8 μm or less, even more preferably 2 μm or more and 6 μm or less, and most preferably 3 μm or more and 5 μm or less. If the average particle size (D50) is more than 10 μm, the particles fall off, causing a decrease in scratch resistance, which is not preferable. If the average particle size (D50) is less than 1 μm, the effect on surface uniformity is insufficient, which is not preferable.

The amount of particles added is preferably 0.5 parts by mass or more and 10 parts by mass or less based on 100 parts by mass of the ionizing radiation curable resin. More preferably, the amount of particles added is 2 parts by mass or more and 8 parts by mass or less, even more preferably 2 parts by mass or more and 6 parts by mass or less, and most preferably 4 parts by mass or more and 5 parts by mass or less. The surface protective layer 5 can form a uniform surface condition by containing particles in the above amount, which is preferable.

The "particle size (average particle size)" may be a value (average value) obtained by measuring the particle size distribution of the particles used, or a value obtained by measuring and averaging the diameters of multiple particles from the cross-sectional observation of the resulting decorative material. Although the measurement methods for both are different, the resulting particle size values are substantially the same. For example, the average particle size of the particles added to the surface protective layer 5 may be a median diameter (D50) measured by a laser diffraction/scattering particle size distribution measuring device.

When the entire surface protective layer 5 is cured with UV light, it is necessary to add a photoinitiator to the surface protective layer 5. Examples of the photoinitiator include, but are not particularly limited to, benzophenone-based, acetophenone-based, benzoin ether-based, and thioxanthone-based photoinitiators.

In order to impart required functions, functional additives, such as an antimicrobial agent and an antifungal agent, may be added to the surface protective layer 5. In addition, an ultraviolet absorbent and a photostabilizer may also be added to the surface protective layer 5, as necessary. It is common to add any combination of the ultraviolet absorbent, such as benzotriazole, benzoate, benzophenone, or triazine-based absorbent, and the photostabilizer, such as hindered amine-based stabilizer.

Such a decorative sheet 1 has a gloss of 15 or less even though it does not contain a matting agent (matting additive). In a conventional decorative sheet, if the gloss of the decorative sheet having a surface protective layer is 8 or less, the surface protective layer has a high matting agent content, and the surface protective layer becomes cloudy. For this reason, there is a risk that the colors and patterns of the colored pattern layer may not be clearly expressed, or that the designability of the decorative sheet may deteriorate. Further, in order to obtain a decorative sheet with a gloss close to 0, the surface protective layer has a higher matting agent content; thus, it is difficult to form a surface protective layer with a smooth surface without creating streaks or unevenness when forming the surface protective layer.

The decorative sheet 1 can provide a decorative sheet with a gloss of 15 or less while maintaining the same performance as a decorative sheet with a gloss of 20 or higher. The "gloss" is a value measured at an angle of incidence of 60 degrees using a gloss meter according to JIS Z 8741.

<Concealing Layer 8>

Concealability for the substrate B can be imparted to the decorative sheet 1 by using a coloring sheet for the primary film layer 2 or by separately providing an opaque concealing layer 8. The concealing layer 8 can be basically formed from the same material as that of the pattern layer 3; however, since it is intended for concealability, the pigment used is preferably an opaque pigment, such as titanium oxide or iron oxide. Further, in order to improve concealability, it is also possible to add, for example, a metal, such as gold, silver, copper, or aluminum. Typically, aluminum flakes are often added.

(Production Method)

An example of the method for producing the decorative sheet 1 will be described.

A resin film is used as a primary film layer 2, and a surface protective layer 5 is formed by printing on the top of the primary film layer 2. The surface of an ionizing radiation curable resin applied to the surface protective layer 5 is irradiated with light of a wavelength of 200 nm or less (first irradiation light) to shrink the surface of the ionizing radiation curable resin. Subsequently, in order to cure the shrunk ionizing radiation curable resin, ionizing radiation or UV light of a longer wavelength than that of the light having a wavelength of 200 nm or less, which is the first irradiation light, is applied. The above procedure forms a decorative sheet 1 comprising a surface protective layer 5 having a core part 5A and a ridge part 5B protruding in a ridge shape from one surface (top) of the core part 5A.

Effects and Others

The decorative sheet 1 according to the present embodiment comprises a surface protective layer 5 with an irregular shape on its surface. With this configuration, the gloss (glossiness) of the surface protective layer can be adjusted, even if the surface protective layer does not contain a matting agent (matting additive). Since the matting agent reduces the oil repellency of a layer formed from a resin material, fingerprints are likely to stick. Since the surface protective layer 5 according to the present embodiment does not contain a matting agent, it does not absorb oil, and oil repellency is relatively improved. For this reason, during site construction or furniture assembly, and in various situations in the daily lives of residents, fingerprints are less likely to adhere to the decorative sheet 1 having the surface protective layer 5.

Further, with the configuration of the surface protective layer 5 with an irregular surface on its surface, the oil repellency of the surface protective layer 5 is improved, and oil stains and adsorption of contaminants on the surface of the decorative sheet 1 can be suppressed.

Further, with the configuration of the surface protective layer 5 that does not contain a matting agent, the particles of the matting agent do not become detached when the surface of the decorative sheet 1 is scratched, and it is possible for the gloss of the surface of the decorative sheet 1 to resist changes, or for scratches to occur.

Further, with the configuration of the surface protective layer 5 that has a Martens hardness within the range of 20 $N/mm^2$ or more and 200 $N/mm^2$ or less, the surface protective layer 5 itself has a certain degree of hardness, which reduces curling of the decorative sheet 1 caused by cure shrinkage of the surface protective layer 5, making lamination onto the substrate easier.

Further, with the configuration of the surface protective layer 5 that has a Martens hardness within the range of 20 $N/mm^2$ or more and 200 $N/mm^2$ or less, since an appropriate degree of flexibility can be imparted to the surface protective layer 5 itself, the decorative sheet 1 is less likely to tear (damage to the decorative sheet 1 is reduced).

In the present embodiment, the surface protective layer 5 is formed of a single layer, but is not limited to such a configuration. For example, the surface protective layer 5 may have a multilayer structure. That is, the surface protective layer 5 may be formed by laminating a plurality of the same ionizing radiation curable resins, or a plurality of different ionizing radiation curable resins, to form an irregular shape on its surface. When a plurality of different ionizing radiation curable resins are laminated, for example, the outermost layer of the surface protective layer 5 has a Martens hardness within the range of 20 $N/mm^2$ or more and 200 $N/mm^2$ or less, its main material is an ionizing radiation curable resin, the ionizing radiation curable resin contains a trifunctional acrylic resin having a repeating structure as a main component, the repeating structure is preferably any of ethylene oxide, propylene oxide, and E-caprolactone structures, the number of repetitions of the repeating structure is 3 or more, and the layer located on the primary film layer 2 side of the surface protective layer 5 (i.e., the layer located below the outermost layer of the surface protective layer 5) is not particularly limited.

Further, for example, the bottom layer of the surface protective layer 5 (the layer located on the primary film layer 2 side of the surface protective layer 5) has a Martens hardness within the range of 20 $N/mm^2$ or more and 200 $N/mm^2$ or less, its main material is an ionizing radiation curable resin, the ionizing radiation curable resin contains a trifunctional acrylic resin having a repeating structure as a main component, the repeating structure is preferably any of ethylene oxide, propylene oxide, and $\iota$-caprolactone structures, the number of repetitions of the repeating structure is 3 or more, and the outermost layer of the surface protective layer 5 is not particularly limited.

EXAMPLES

Next, examples based on the present invention are illustrated.

Example 1

Impregnated paper with a basis weight of 50 $g/m^2$ (GFR-506, manufactured by Kohjin Film & Chemicals Co., Ltd.) was used as a primary film layer 2, and a pattern layer 3 was formed on one surface thereof using an oil-based nitrocellulose resin gravure printing ink (PCNT (PCRNT), manufactured by Toyo Ink Co., Ltd., for each color), after which the following surface protective layer coating liquid was applied. The layer thickness of the surface protective layer coating liquid was 5 μm. Thereafter, the surface of the surface protective layer coating liquid was irradiated with a Xe excimer lamp at a wavelength of 172 nm so that the integrated light intensity was 100 $mJ/cm^2$, thereby shrinking the surface. Subsequently, ionizing radiation was applied to cure the surface protective layer coating liquid to form a surface protective layer 5, thereby obtaining a decorative sheet of Example 1.

(Surface Protective Layer Coating Liquid)

The surface protective layer coating liquid was prepared by compounding the following ionizing radiation curable resin with the following particles.

Ionizing Radiation Curable Resin

Type: trimethylolpropane EO-modified triacrylate (EO 6 mol added)

Product name: Miramer M3160 (manufactured by Miwon)

Compounding amount: 100 parts by mass

Particles

Product name: SYLYSIA 250N (manufactured by Fuji Silysia Chemical Ltd.)

Particle size: 5 μm

Compounding amount: 0.5 parts by mass

Example 2

A decorative sheet of Example 2 was obtained in the same manner as in Example 1, except that the ionizing radiation curable resin of Example 1 was replaced with the following resin.

Ionizing Radiation Curable Resin

Type: trimethylolpropane EO-modified triacrylate (EO 15 mol added)

Product name: SR9035 (manufactured by Sartomer)

Example 3

A decorative sheet of Example 3 was obtained in the same manner as in Example 1, except that the ionizing radiation curable resin of Example 1 was replaced with the following resin.

Ionizing Radiation Curable Resin

Type: trimethylolpropane EO-modified triacrylate (EO3 mol added)

Product name: Miramer M3130 (manufactured by Miwon)

Example 4

A decorative sheet of Example 4 was obtained in the same manner as in Example 1, except that the ionizing radiation curable resin of Example 1 was replaced with the following resin.

Ionizing Radiation Curable Resin

Type: trimethylolpropane PO-modified triacrylate (PO 6 mol added)

Product name: NK Ester A-TMPT-6PO (manufactured by Shin-Nakamura Chemical Co., Ltd.)

Example 5

A decorative sheet of Example 5 was obtained in the same manner as in Example 1, except that the ionizing radiation curable resin of Example 1 was replaced with the following resin.

Ionizing Radiation Curable Resin

Type: caprolactone-modified tris (2-acryloxyethyl) iso-cyanurate (caprolactone (CL) 3 mol added)

Product name: NK Ester A-9300-3CL (manufactured by Shin-Nakamura Chemical Co., Ltd.)

Example 6

A decorative sheet of Example 6 was obtained in the same manner as in Example 1, except that the layer thickness of the surface protective layer coating liquid of Example 1 was set to 1 μm.

Example 7

A decorative sheet of Example 7 was obtained in the same manner as in Example 1, except that the layer thickness of the surface protective layer coating liquid of Example 1 was set to 2 μm.

Example 8

A decorative sheet of Example 8 was obtained in the same manner as in Example 1, except that the layer thickness of the surface protective layer coating liquid of Example 1 was set to 20 μm.

Example 9

A decorative sheet of Example 9 was obtained in the same manner as in Example 1, except that the layer thickness of the surface protective layer coating liquid of Example 1 was set to 25 μm.

Example 10

A decorative sheet of Example 10 was obtained in the same manner as in Example 8, except that the ionizing radiation curable resin of Example 8 was replaced with the following resin.

Ionizing Radiation Curable Resin

Type: trimethylolpropane EO-modified triacrylate (EO 30 mol added)

Example 11

A decorative sheet of Example 11 was obtained in the same manner as in Example 9, except that the particles of Example 9 were not compounded.

Example 12

A decorative sheet of Example 12 was obtained in the same manner as in Example 3, except that the particles of Example 3 were not compounded.

Example 13

A decorative sheet of Example 13 was obtained in the same manner as in Example 1, except that the particles of Example 1 were replaced with the following particles.

Particles

Product name: SYLYSIA 450 (manufactured by Fuji Silysia Chemical Ltd.)

Particle size: 8.0 μm

Compounding amount: 0.5 parts by mass

Example 14

A decorative sheet of Example 14 was obtained in the same manner as in Example 1, except that the particles of Example 1 were replaced with the following particles.

Particles

Product name: SYLYSIA 780 (manufactured by Fuji Silysia Chemical Ltd.)

Particle size: 11.3 μm

Compounding amount: 0.5 parts by mass

Example 15

A decorative sheet of Example 15 was obtained in the same manner as in Example 1, except that the amount of the particles of Example 1 compounded was changed to 10 parts by mass.

Example 16

A decorative sheet of Example 16 was obtained in the same manner as in Example 1, except that the amount of the particles of Example 1 compounded was changed to 11 parts by mass.

Example 17

A decorative sheet of Example 17 was obtained in the same manner as in Example 1, except that the layer thickness of the surface protective layer coating liquid of Example 1 was set to 1 μm, and the particles were not compounded.

Example 18

A decorative sheet of Example 18 was obtained in the same manner as in Example 1, except that the ionizing radiation curable resin of Example 1 was replaced with the following resin.

Ionizing Radiation Curable Resin 1 (Main Component)

Type: trimethylolpropane EO-modified triacrylate (EO 6 mol added)

Product name: Miramer M3160 (manufactured by Miwon)

Compounding amount: 60 parts by mass

Ionizing Radiation Curable Resin 2

Type: dipentaerythritol hexaacrylate

Product name: Miramer M600 (manufactured by Miwon)

Compounding amount: 40 parts by mass

Comparative Example 1

A decorative sheet of Comparative Example 1 was obtained in the same manner as in Example 1, except that the excimer lamp irradiation of Example 1 was not performed, and the amount of the particles compounded was changed to 15 parts by mass.

Comparative Example 2

A decorative sheet of Comparative Example 2 was obtained in the same manner as in Example 1, except that the ionizing radiation curable resin of Example 1 was replaced with the following resin.

Ionizing Radiation Curable Resin

Type: ethylene glycol diacrylate (EO 9 mol added)

Product name: Light Acrylate 9EG-A (manufactured by Kyoeisha Chemical Co., Ltd.)

Comparative Example 3

A decorative sheet of Comparative Example 3 was obtained in the same manner as in Example 1, except that the ionizing radiation curable resin of Example 1 was replaced with the following resin.

Ionizing Radiation Curable Resin

Type: ethoxylated pentaerythritol tetraacrylate (EO 12 mol added)

Comparative Example 4

A decorative sheet of Comparative Example 4 was obtained in the same manner as in Example 1, except that the ionizing radiation curable resin of Example 1 was replaced with the following resin.

Ionizing Radiation Curable Resin

Type: dipentaerythritol hexaacrylate

Product name: Miramer M600 (manufactured by Miwon)

Comparative Example 5

A decorative sheet of Comparative Example 5 was obtained in the same manner as in Example 1, except that the ionizing radiation curable resin of Example 1 was replaced with the following resin.

Ionizing Radiation Curable Resin

Type: trimethylolpropane triacrylate

Product name: NK Ester A-TMPT (manufactured by Shin-Nakamura Chemical Co., Ltd.)

(Evaluation)

The decorative sheets of Examples 1 to 18 and Comparative Examples 1 to 5 obtained by the above methods were evaluated.

In this example, those that were evaluated as "A" and "B" were regarded as a pass because there was no problem in practical use.

<Surface Condition>

Regarding the surface condition, the surface uniformity was visually evaluated.

The evaluation criteria were as follows.

A: The surface condition was uniform.

B: Some areas were not uniform.

C: The surface condition was non-uniform over the entire surface

<Glossiness>

Regarding the glossiness, the 60-degree glossiness was measured using Rhopoint IQ (manufactured by Konica Minolta, Inc.). In Tables 1 and 2, the 60-degree glossiness was expressed as "60° gloss value."

<Method of Measuring Martens Hardness>

The method of measuring the Martens hardness is described. The Martens hardness of each decorative sheet was measured using a Martens hardness measuring device (FISCHERSCOPE HM 2000, manufactured by Fischer Instruments) that complies with ISO 14577. Since measurements were made on a cross section, after surrounding each decorative sheet 1 with a resin, such as a cold-hardening epoxy resin or a UV curing resin, and sufficiently curing it, it was cut so that a cut surface of each decorative sheet 1 was exposed, and then mechanical polishing was performed to obtain the measurement surface of each sample. The specific measurement method is to press an indenter into the measurement surface of each sample and calculate Martens hardness from the indentation depth and the load. The measurement was carried out with a test force of 10 mN, a test force loading required time of 10 seconds, and a test force maintaining time of 5 seconds.

<Fingerprint Resistance: Wipeability Evaluation>

Fingerprint wipeability evaluation was carried out to evaluate fingerprint resistance.

The 60-degree glossiness of the surface of each decorative sheet was measured and regarded as an [initial glossiness].

Subsequently, a fingerprint resistance evaluation liquid was attached onto the surface protective layer, and then the fingerprint resistance evaluation liquid attached to the decorative sheet surface was wiped off. Thereafter, the 60-degree glossiness of the area where the fingerprint resistance evaluation liquid was wiped off was measured and regarded as [glossiness after wiping]. The fingerprint resistance evaluation liquid used herein was a higher fatty acid.

The fingerprint wiping rate was calculated as follows.

Fingerprint wiping rate (%) =

$$(\text{glossiness after wiping/initial glossiness}) \times 100$$

The evaluation criteria were as follows.

A: 70% or more and less than 250%

B: 50% or more and less than 70%, or 250% or more and less than 300%

C: less than 50%, or 300% or more

<Stain Resistance>

The stain resistance was evaluated by the Stain A test defined in the Japanese Agricultural Standards (JAS). Specifically, lines with a width of 10 mm were drawn each using blue ink, black quick-drying ink, and red crayon, and left for 4 hours. Then, the blue ink, black quick-drying ink, and red crayon lines were wiped off with a cloth soaked in ethanol, and ink stain resistance was evaluated.

The evaluation criteria were as follows.

A: Each color line could be easily wiped off.

B: Although part of each color line could be wiped off, some stains remained.

C: Each color line could not be wiped off.

<Scratch Resistance Test: Steel Wool Rubbing Test>

After the obtained decorative sheet was attached to a wood substrate B using a urethane-based adhesive, a steel wool rubbing test was carried out to evaluate the scratch resistance. Steel wool was rubbed back and forth 20 times with a load of 100 g applied to each, and the surface of the decorative sheet was visually checked for scratches and changes in gloss.

The evaluation criteria were as follows.

A: No scratches or changes in gloss occurred on the surface.

B: Minor scratches and/or changes in gloss occurred on the surface.

C: Significant scratches and/or changes in gloss occurred on the surface.

<Processability Test: Curl>

Figure 6:
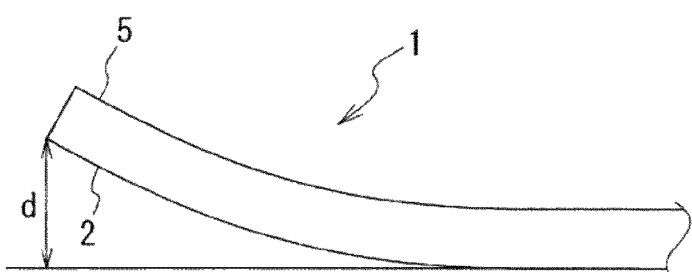
FIG. 6 is a schematic cross-sectional view explaining a curl test measurement method.

The obtained decorative sheets were each cut into 10-cm squares and allowed to stand at 25° C. and 50% RH for 48 hours. Then, the average distance between the four corners and the plane was calculated. That is, in this curl test, as shown in FIG. 6, the minimum distance d from the surface (plane) of the test stand on which the decorative sheet was placed to each corner portion of the decorative sheet was measured, and these values were averaged to evaluate the curliness of the decorative sheet.

The evaluation criteria were as follows.

A: 3 cm or less

B: more than 3 cm and 5 cm or less

C: more than 5 cm

<Processability Test: Wrapping Processing (Tearing)>

The obtained decorative sheets were subjected to wrapping processing. The edge of the cut decorative sheet was visually observed to evaluate tearing.

The evaluation criteria were as follows.

A: There was no tearing.

B: There was tearing in some areas.

C: There was tearing all over the surface.

Tables 1 and 2 show the evaluation results.

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Surface shape | | Ridge shape | Ridge shape | Ridge shape | Ridge shape | Ridge shape | Ridge shape | Ridge shape | Ridge shape | Ridge shape | Ridge shape |
| RSm/Ra | | 120 | 100 | 200 | 120 | 120 | 300 | 200 | 80 | 50 | 10 |
| Martens hardness (N/mm²) | | 50 | 40 | 80 | 50 | 80 | 50 | 50 | 50 | 50 | 30 |
| Thickness (μm) | | 5 | 5 | 5 | 5 | 5 | 1 | 2 | 20 | 25 | 20 |
| Main component of ionizing radiation curable resin | Ratio (parts by mass) | 100 | 100 | 100 | 100 | 100 | 100 | 100 | 100 | 100 | 100 |
| | Number of functional groups | 3 | 3 | 3 | 3 | 3 | 3 | 3 | 3 | 3 | 3 |
| | Repeating structure — Structure | C2H4O | C2H4O | C2H4O | C3H6O | C6H10O2 | C2H4O | C2H4O | C2H4O | C2H4O | C2H4O |
| | Repeating structure — Number of repetitions | 6 | 15 | 3 | 6 | 3 | 6 | 6 | 6 | 6 | 30 |
| Additive | Particle size (μm) | 5 | 5 | 5 | 5 | 5 | 5 | 5 | 5 | 5 | 5 |
| | Addition amount (parts) | 0.5 | 0.5 | 0.5 | 0.5 | 0.5 | 0.5 | 0.5 | 0.5 | 0.5 | 0.5 |
| Surface condition | | A | A | A | A | A | B | A | A | A | A |
| 60° gloss value | | 3 | 2 | 5 | 3 | 10 | 8 | 5 | 2 | 1.5 | 0.8 |
| Fingerprint resistance | | A | A | A | A | A | A | A | A | A | A |
| Stain resistance | Stain A | A | A | A | A | A | A | A | A | A | A |
| Scratch resistance | Steel 100 g | A | A | A | A | A | B | A | A | A | A |
| Processability | Curl | A | A | A | A | A | A | A | B | B | B |
| | Tear | A | A | A | A | A | A | A | A | A | A |

|  |  | Example 11 | Example 12 | Example 13 | Example 14 | Example 15 | Example 16 | Example 17 | Example 18 |
|---|---|---|---|---|---|---|---|---|---|
| Surface shape | | Ridge shape | Ridge shape | Ridge shape | Ridge shape | Ridge shape | Ridge shape | Ridge shape | Ridge shape |
| RSm/Ra | | 50 | 250 | 120 | 120 | 140 | 120 | 300 | 300 |
| Martens hardness (N/mm²) | | 50 | 80 | 50 | 50 | 50 | 50 | 50 | 200 |

TABLE 1-continued

| | | | | | | | | | | |
|---|---|---|---|---|---|---|---|---|---|---|
| | Thickness (μm) | | 25 | 5 | 5 | 5 | 5 | 5 | 1 | 5 |
| Main component of ionizing radiation curable resin | Ratio (parts by mass) | | 100 | 100 | 100 | 100 | 100 | 100 | 100 | 60 |
| | Number of functional groups | | 3 | 3 | 3 | 3 | 3 | 3 | 3 | 3 |
| | Repeating structure | Structure | C2H4O | C2H4O | C2H4O | C2H4O | C2H4O | C2H4O | C2H4O | C2H4O |
| | | Number of repetitions | 6 | 3 | 6 | 6 | 6 | 6 | 6 | 6 |
| Additive | Particle size (μm) | | None | None | 8 | 11.3 | 5 | 5 | None | 5 |
| | Addition amount (parts) | | — | — | 0.5 | 0.5 | 10 | 11 | — | 0.5 |
| Surface condition | | | B | B | A | A | A | A | B | B |
| 60° gloss value | | | 3 | 7 | 3 | 3 | 3 | 3 | 10 | 10 |
| Fingerprint resistance | | | A | A | A | B | A | B | A | A |
| Stain resistance | Stain A | | A | A | A | B | A | B | A | A |
| Scratch resistance | Steel 100 g | | A | A | A | B | A | B | B | A |
| Processability | Curl | | B | A | A | A | A | A | A | A |
| | Tear | | A | A | A | A | A | A | A | B |

TABLE 2

| | | | Comparative Example 1 | Comparative Example 2 | Comparative Example 3 | Comparative Example 4 | Comparative Example 5 |
|---|---|---|---|---|---|---|---|
| Surface shape | | | Irregularities caused by particles | Ridge shape | Ridge shape | Ridge shape | Ridge shape |
| RSm/Ra | | | 400 | 100 | 300 | 4000 | 4000 |
| Martens hardness (N/mm²) | | | 50 | 10 | 80 | 300 | 120 |
| | Thickness (μm) | | 5 | 5 | 5 | 5 | 5 |
| Main component of ionizing radiation curable resin | Ratio (parts by mass) | | 100 | 100 | 100 | 100 | 100 |
| | Number of functional groups | | 3 | 2 | 4 | 6 | 3 |
| | Repeating structure | Structure | C2H4O | C2H4O | C2H4O | None | None |
| | | Number of repetitions | 6 | 9 | 12 | 0 | 0 |
| Additive | Particle size (μm) | | 5 | 5 | 5 | 5 | 5 |
| | Addition amount (parts) | | 15 | 0.5 | 0.5 | 0.5 | 0.5 |
| Surface condition | | | A | A | A | A | A |
| 60° gloss value | | | 10 | 3 | 10 | 90 | 90 |
| Fingerprint resistance | | | C | A | A | C | C |
| Stain resistance | Stain A | | C | A | A | A | A |
| Scratch resistance | Steel 100 g | | C | C | A | A | A |
| Processability | Curl | | A | A | A | C | A |
| | Tear | | A | A | C | C | A |

As shown in Table 1, the decorative sheets of Examples 1 to 18 make it possible to provide decorative sheets that have a gloss value of 15 or less and satisfy all of fingerprint resistance, scratch resistance, stain resistance, and processability. The performance can be further improved by optimizing the thickness of the surface protective layer, the particle size of the particles compounded, and the amount of the particles added, other than the surface shape of the surface protective layer and the resin composition of the surface protective layer.

REFERENCE SIGNS LIST

1 Decorative sheet; 2 Primary film layer; 3 Pattern layer; 4 Transparent resin layer; 5 Surface protective layer; 6 Primer layer; 7 Adhesive layer; 8 Concealing layer; 11 Decorative material; B Substrate.

What is claimed is:

1. A decorative sheet, comprising:

a primary film layer and a surface protective layer provided on one surface of the primary film layer, wherein:

the surface protective layer has a gloss of 15 or less;

the surface protective layer has a ridge part protruding in a ridge shape on its surface to form an irregular shape;

the surface protective layer has a Martens hardness within the range of 20 N/mm² or more and 200 N/mm² or less;

the surface protective layer contains an ionizing radiation curable resin as a main material;

the ionizing radiation curable resin contains a trifunctional acrylic resin having a repeating structure as a main component;

the number of repetitions of the repeating structure is 3 or more;

the irregular shape of the surface protective layer has RSm/Ra within the range of 10 or more and 300 or less, wherein the surface protective layer has a thickness within the range of 2 μm or more and 25 μm or less, wherein the repeating structure is any of ethylene oxide, propylene oxide, and ε-caprolactone structures, the surface protective layer comprises particles have an average particle size of 10 μm or less, and the particles are added in an amount within the range of 0.5 parts by mass or more and 10 parts by mass or less based on 100 parts by mass of the ionizing radiation curable resin.

2. The decorative sheet of claim 1, wherein the surface protective layer has the thickness within the range of 2 μm or more and 20 μm or less.

3. The decorative sheet of claim 1, wherein the irregular shape of the surface protective layer has RSm/Ra within the range of 50 or more and 300 or less.

4. The decorative sheet of claim 1, wherein the irregular shape of the surface protective layer has RSm/Ra within the range of 100 or more and 300 or less.

5. The decorative sheet of claim 1, wherein the ionizing radiation-curable resin is selected from the group consisting of trimethylolpropane EO-modified triacrylate and caprolactone-modified tris(2-acryloxyethyl)isocyanurate.

6. The decorative sheet of claim 1, wherein the ionizing radiation curable resin is selected from the group consisting of trimethylolpropane triacrylate, glycerol triacrylate, isocyanurate triacrylate and pentaerythritol triacrylate.

\* \* \* \* \*